United States Patent
Schick et al.

(10) Patent No.: US 8,505,161 B2
(45) Date of Patent: Aug. 13, 2013

(54) ROAD SWEEPER

(75) Inventors: Roland Schick, Auenwald (DE);
Andreas Kral, Remshalden (DE); Peter Knebel, Schorondorf (DE); Uwe Weller, Allmersbach i. T. (DE); Nikolaus Kocher, Villingen-Schwenningen (DE); Marcus Haug, Steinheim an der Murr (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 13/567,657

(22) Filed: Aug. 6, 2012

(65) Prior Publication Data

US 2013/0025076 A1    Jan. 31, 2013

Related U.S. Application Data

(63) Continuation of application No. PCT/EP2011/051656, filed on Feb. 4, 2011.

(30) Foreign Application Priority Data

Feb. 8, 2010 (DE) .......................... 10 2010 001 678

(51) Int. Cl.
  *E01H 1/08* (2006.01)
(52) U.S. Cl.
  USPC .......................................... 15/352; 15/340.1
(58) Field of Classification Search
  USPC ..................... 15/340.1, 340.3, 352
  IPC ....................................................... E01H 1/08
  See application file for complete search history.

(56) References Cited

U.S. PATENT DOCUMENTS

| 3,798,878 | A | 3/1974 | Pausch |
| 3,973,935 | A | 8/1976 | Moore, Jr. et al. |
| 4,099,940 | A | 7/1978 | Mortensen et al. |
| 4,452,616 | A | 6/1984 | Gillingham et al. |
| 4,486,201 | A | 12/1984 | Noguchi |
| 4,756,727 | A | 7/1988 | Howeth |
| 5,901,407 | A | 5/1999 | Boomgaarden |

FOREIGN PATENT DOCUMENTS

| DE | 26 29 967 A1 | 2/1977 |
| DE | 3 406 816 A1 | 9/1984 |
| DE | 41 38 223 C1 | 2/1993 |
| DE | 100 29 225 C2 | 1/2002 |
| DE | 10 2005 036 807 A1 | 2/2007 |
| WO | WO 97/00115 A1 | 1/1997 |
| WO | WO 2009/132757 A1 | 11/2009 |

*Primary Examiner* — David Redding
(74) *Attorney, Agent, or Firm* — Womble Carlyle Sandridge & Rice, LLP

(57) ABSTRACT

A road sweeper is provided with a rotatingly drivable sweeping brush, a sweepings container, a suction blower in flow communication with the sweeping brush for taking in dust-containing air, and at least one filter for separating dust from the air drawn in, wherein the filter can be acted upon on the clean side with external air stored in a pressure container and subject to pressure, via at least one external air valve for cleaning. In order for the filter to be cleaned off with as small an amount of external air as possible, the pressure container can have a pressure container wall located opposite the clean side of the at least one filter, the at least one external air valve being arranged on the wall, wherein a section of a suction conduit extends between the pressure container wall and the clean side of the filter.

17 Claims, 4 Drawing Sheets

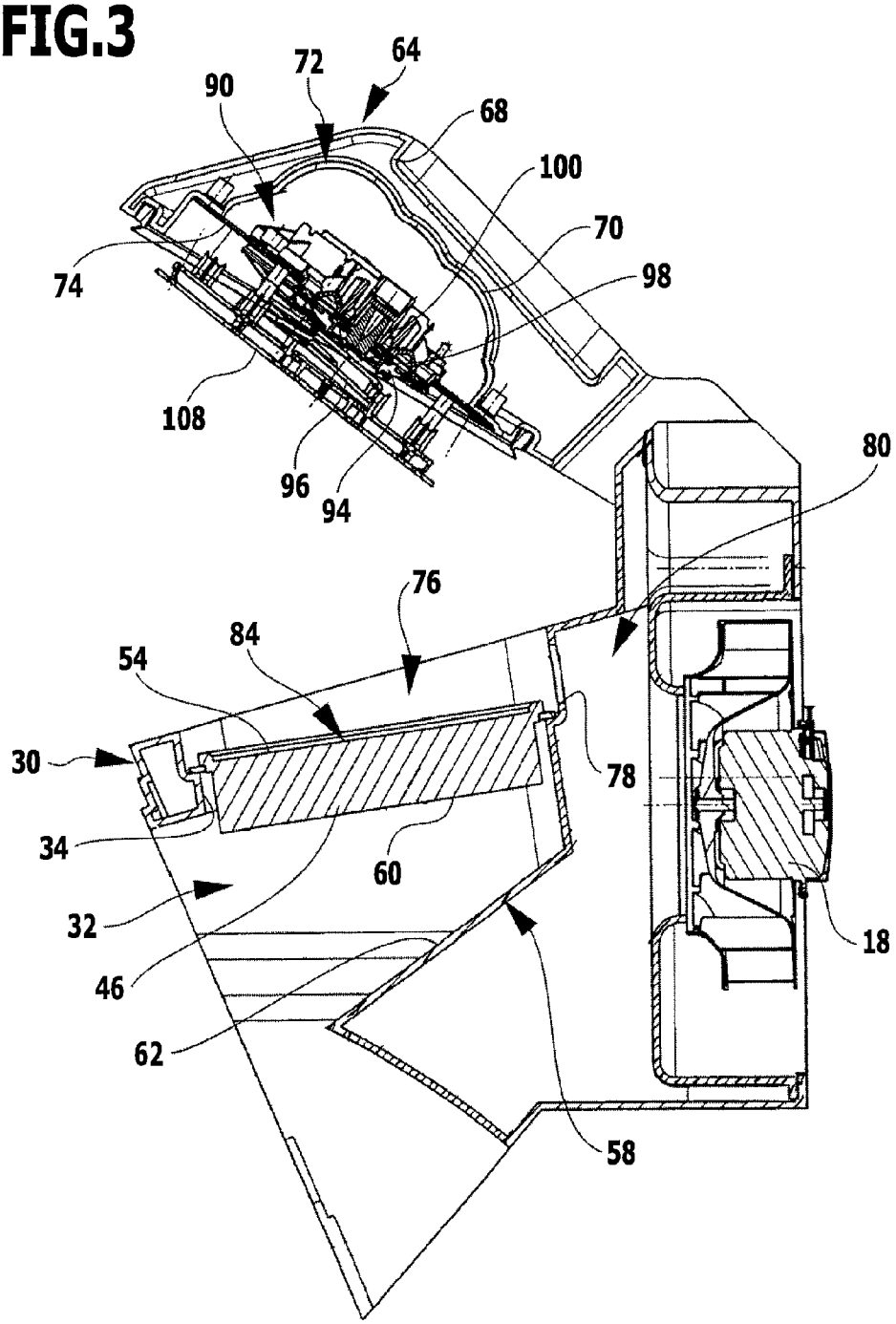

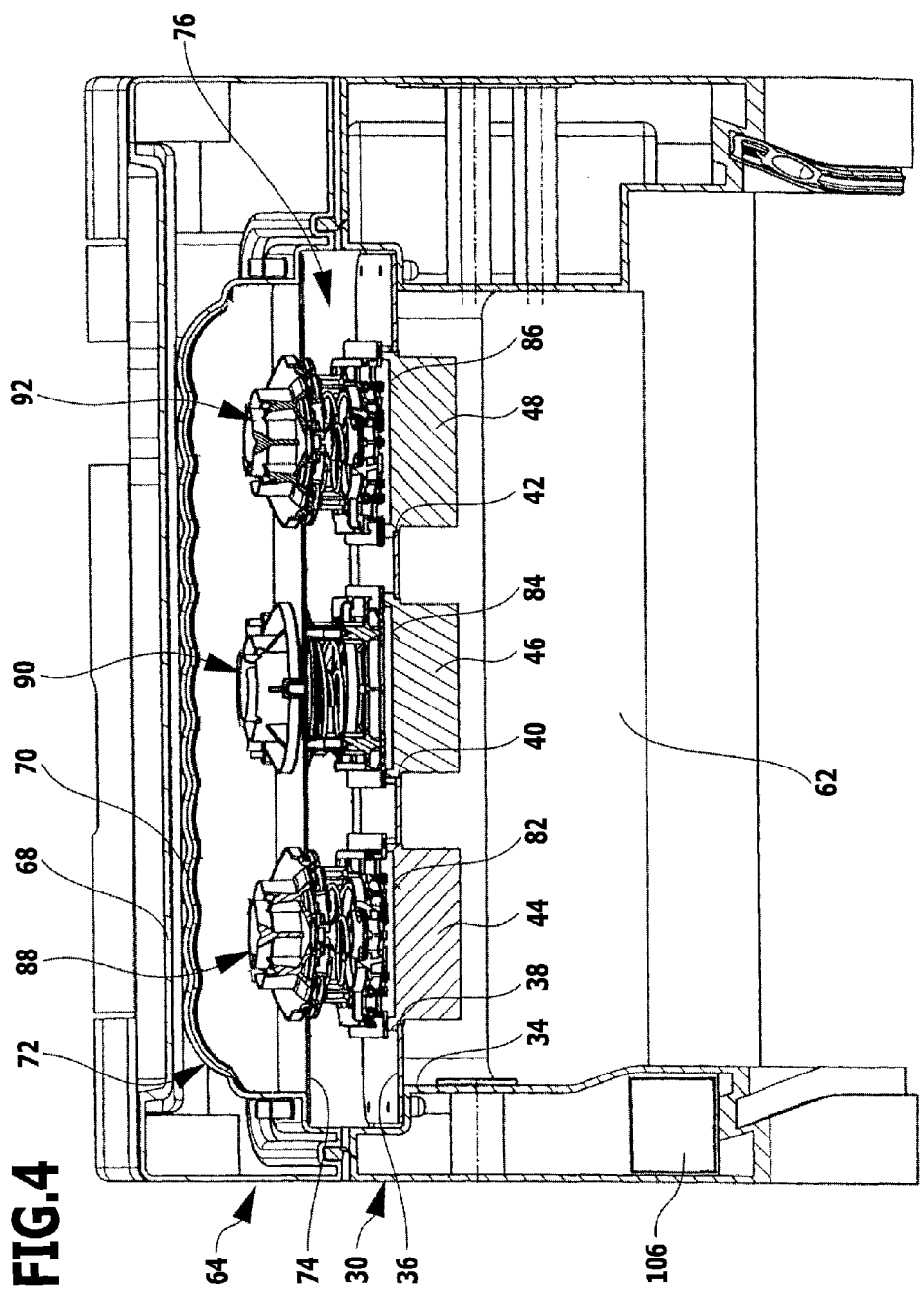

ROAD SWEEPER

CROSS-REFERENCE TO RELATED APPLICATIONS

This application is a continuation of international application number PCT/EP2011/051656, filed on Feb. 4, 2011, which claims priority to German Application No. 10 2010 001 678.0, filed Feb. 8, 2010, both of which are incorporated herein by reference in their entirety and for all purposes.

BACKGROUND OF THE INVENTION

The invention relates to a road sweeper with a rotatingly drivable sweeping brush and a sweepings container as well as a suction blower which is in flow communication with the sweeping brush via a suction conduit and an intake duct for the purpose of taking in dust-containing air, and with at least one filter for separating dust from the air drawn in, wherein the at least one filter can be acted upon on the clean side with external air, which is stored in a pressure container and is subject to pressure, via at least one external air valve for the purpose of cleaning.

Road sweepers of this type are known, for example, from DE 26 29 967 A1. With their aid, a ground surface to be cleaned can be swept, wherein coarse sweepings are transferred into the sweepings container by means of the rotatingly drivable sweeping brush. Sweeping of a dry ground surface often results in a considerable generation of dust. In order to counteract this, the road sweeper has a suction blower which is in flow communication with the sweeping brush via a suction conduit and an intake duct. With the aid of the suction blower, dust-containing air can be drawn in so that the generation of dust during sweeping of the dry ground surface is kept low. On its way from the sweeping brush to the suction blower the air drawn in flows through a filter for the purpose of separating dust. The filter becomes clogged during the course of time and must, therefore, be cleaned off after a certain time. For this purpose, the road sweeper has a pressure container, in which air subject to pressure is stored and from which the air can be supplied via an external air valve to the clean side of the filter, i.e. the side of the filter facing away from the sweepings container. The external air subject to pressure flows through the filter contrary to the direction of flow of the air drawn in which prevails during normal sweeping operation. As a result, the filter will be cleaned off.

In the case of the road sweeper known from DE 26 29 967 A1, a plurality of filters are used which are each configured in the form of a filter cartridge. One air pipe is associated each time with eleven filter cartridges and this extends above the filter cartridges and has essentially in the center of the filter cartridges openings or nozzles, via which the filter cartridges can be acted upon with external air. The external air is supplied to the air pipes from a pressure container in the form of an air distribution pipe via a magnetic valve. The pressure in the air distribution pipe is more than 7 bar and each magnetic valve is opened for a period of time of 0.1 seconds. As a result, a common stream of air is supplied to a respective eleven filter cartridges and this flows through the associated air pipe.

The fact that an effective cleaning of the filter is guaranteed only when a considerable amount of external air flows through the filters has proven to be disadvantageous in the case of the road sweeper known from DE 26 29 967 A1. This large amount of external air must, subsequently, be drawn off again by the suction blower, namely within a very short period of time since, otherwise, there is the risk of the external air exiting from the road sweeper via the intake duct in the area of the sweeping brush. This would increase the generation of dust which is to be avoided.

The object of the present invention is to further develop a road sweeper of the type specified at the outset in such a manner that the at least one filter can be cleaned off effectively with as small an amount of external air as possible.

SUMMARY OF THE INVENTION

This object is accomplished in accordance with the invention, in a road sweeper of the generic type, in that the pressure container has a pressure container wall which is located opposite the clean side of the at least one filter and on which the at least one external air valve is arranged, wherein a section of the suction conduit extends between the pressure container wall and the clean side of the filter.

The invention incorporates the idea that by arranging a pressure container wall, on which the at least one external air valve is positioned, opposite the clean side of the filter the latter can be acted upon with a pressure pulse when the external air valve is opened briefly and this will lead to a mechanical cleaning off of the filter. Only a section of the suction conduit extends between the at least one external air valve and the at least one filter and so the external air which is subject to pressure can be supplied directly to the clean side of the filter from the pressure container via the external air valve and the section of the suction conduit. As a result, a strong pressure pulse can be exerted without a large amount of external air being required for this purpose. The amount of external air which flows through the filter to be cleaned off contrary to the direction of flow prevailing during normal sweeping operation can be kept small and, nevertheless, a sizeable pressure pulse can be generated. There is, therefore, practically no risk of external air being blown out of the road sweeper via the intake duct.

The arrangement of the pressure container wall, on which the at least one external air valve is held, directly opposite the clean side of the filter to be cleaned off has, in addition, the advantage that the constructional design of the road sweeper is simplified. Air supply lines, via which the external air which is subject to pressure is conveyed to the at least one filter from the pressure container, are omitted. The road sweeper according to the invention is, therefore, also characterized by a simplified, constructional design as well as by a very compact structural form. Air supply lines of this type have, in addition, the disadvantage that they weaken a pressure pulse which is formed when the external air valve is opened. According to the invention, the pressure pulse proceeding from the external air valve impinges directly on the filter arranged opposite the pressure container once it has crossed the suction conduit running between the pressure container and the at least one filter. The pressure pulse therefore has a considerable strength without a large amount of external air needing to be taken from the pressure container.

During the cleaning off of the at least one filter, the operation of the suction blower can be maintained. As a result, some of the external air, which exits from the pressure container and impinges on the clean side of the filter to be cleaned off, will be drawn off by the suction blower still in the suction conduit.

Only a certain proportion of the external air flows through the filter to be cleaned off in order to be drawn in again, subsequently, by the suction blower.

It is of particular advantage when the pressure container wall, on which the at least one external air valve is arranged, forms a duct wall of the suction conduit. The suction conduit extends from the clean side of the at least one filter as far as the suction blower. A section of the suction conduit adjoining the clean side of the filter can be limited, on the one hand, by the filter and, on the other hand, by the pressure container wall located opposite the filter. The distance between the clean side of the filter and the pressure container wall can, in this respect, be kept very small; it may, for example, be less than 10 cm, in particular less than 7 cm.

Favorably, the at least one filter is a flat-fold filter which defines a filter plane on the clean side and the pressure container wall, on which the at least one external air valve is arranged, extends parallel to the filter plane. The parallel arrangement results in the pressure pulse, which is formed when the at least one external air valve is opened, impinging on the flat-fold filter with great intensity, mechanically jarring it and, as a result, cleaning it off.

The pressure container wall, on which the at least one external air valve is arranged, forms a bottom wall of the pressure container in one preferred development of the invention. With such a configuration, the pressure container is arranged above the at least one filter of the road sweeper, wherein a section of the suction conduit extends between the filter and the pressure container.

It is favorable when the pressure container has a curved cover wall which is sealingly connected to the bottom wall. The curved configuration of the cover wall gives it a high mechanical loading capacity without the cover wall needing to have a great material thickness for this purpose.

The bottom wall is, in one preferred configuration, produced from metal in the form of a bottom plate. Alternatively, it may be provided for the bottom wall to be produced from a plastic material. In this respect, it is of advantage when the bottom wall has reinforcing ribs.

The reinforcing ribs of the bottom wall are favorably arranged on the inner side of the bottom wall, i.e. in the interior area of the pressure container.

The cover wall is favorably produced from a plastic material.

It is of particular advantage when a baffle wall is arranged at a distance from the dirt side of the at least one filter. The pressure pulse resulting when the at least one external air valve is opened briefly impinges on the baffle wall at a distance from the dirt side of the filter once it has passed through the filter to be cleaned off and will be reflected by this wall at least partially again in the direction towards the filter to be cleaned off. This aids the cleaning effect of the pressure pulse. In addition, the pressure pulse is prevented from exiting outwards via the intake duct, as a result.

It is favorable when the baffle wall is formed by a duct wall of the intake duct. This simplifies the constructional design of the road sweeper and has, in addition, the advantage that a separate baffle wall, which would have to be secured by means of additional connecting elements, can be omitted.

The air stored in the pressure container is subject to overpressure. In order to avoid any inadmissibly high overpressure forming within the pressure container, the pressure container is preferably equipped with a safety valve which opens automatically when a maximum admissible overpressure is exceeded.

It is of particular advantage when the at least one external air valve is designed as a safety valve which opens automatically when a maximum admissible overpressure in the pressure container is reached. An additional safety valve can, therefore, be omitted. The at least one external air valve undertakes two functions with such a configuration. On the one hand, it enables a pressure pulse to be provided briefly for cleaning off the at least one filter. On the other hand, it limits the maximum admissible pressure in the pressure container. If the pressure in the pressure container exceeds a maximum admissible value, the at least one external air valve automatically transfers into its open position so that air subject to pressure can escape from the pressure container. A separate safety valve can, therefore, be omitted.

The at least one external air valve is, in one preferred configuration of the invention, equipped as a magnetic valve and comprises a valve plate which is held in a closed position by an electromagnet acted upon by a current. The electromagnet can be connected to an electric control unit which interrupts the exciting current of the electromagnet at intervals of time. The valve plate can then transfer automatically into its open position on account of the overpressure acting on it. As a result, a pressure pulse can be formed which impinges on the clean side of the filter. After a short interruption, the exciting current will again be provided by the electric control unit and so the valve plate can again be held in its closed position.

It is of particular advantage when the valve plate is moved into its closed position from its open position by means of a closure spring. The closure spring can be arranged between the pressure container wall and the clean side of the filter.

A supporting element is preferably arranged on the clean side of the at least one filter and this supports the filter on the clean side during normal suction operation. The closure spring of the external air valve can be clamped between the supporting element of the filter and the valve plate of the external air valve.

The supporting element can be designed, for example, in the form of a supporting grate which covers the clean side of the at least one filter.

The overpressure prevailing in the pressure container during normal sweeping operation of the road sweeper is at the most 1 bar in one advantageous embodiment of the invention. The overpressure is, therefore, relatively low. On account of the arrangement of the at least one external air valve on the pressure container wall located opposite the clean side of the at least one filter, the at least one filter can be acted upon with a pressure pulse which enables an effective cleaning off of the filter despite the relatively low overpressure.

The provision of an overpressure of at the most 1 bar also has the advantage that the valve opening of the at least one external air valve can be designed to cover a relatively large surface area. The large valve opening, on the other hand, ensures that a strong pressure pulse can be generated during the brief opening of the at least one external air valve.

The overpressure prevailing in the pressure container during normal sweeping operation of the road sweeper is preferably at the most 500 mbar.

It may be provided, in particular, for the overpressure in the pressure container to be approximately 250 mbar to approximately 350 mbar.

In one advantageous embodiment of the invention, the road sweeper comprises several external air valves which are each arranged in alignment with a filter or a filter section. It may, for example, be provided for the road sweeper to have, in alignment with each external air valve, a separate filter which can be cleaned off by opening the associated external air valve. It may, however, also be provided for an external air valve to be associated with each of various filter areas of a filter of the road sweeper. The associated filter area can be cleaned off by opening the respective external air valve briefly.

The provision of several external air valves which are each arranged in alignment with a filter or a filter section has the advantage that a first filter or a first filter section can be cleaned off while at the same time suction operation can be maintained via at least a second filter or at least a second filter section. External air which flows through a filter or a filter section during the cleaning process can be drawn in again by the suction blower via the other filter or the other filter section and so there is no risk of the external air exiting outwards in the area of the sweeping brush via the intake duct.

It is particularly favorable when, first of all, all the external air valves are closed following the brief opening of a first external air valve and the cleaning process associated therewith so that normal suction operation can continue and that, subsequently, another external air valve is opened for a short time in order to then transfer into its closed position again for further suction operation following the filter cleaning process. Each filter cleaning process is therefore followed by normal suction operation. As a result, it is ensured that all the external air will be reliably drawn off by the suction blower.

Favorably, the at least one filter is adapted to be replaced. In this respect, it is of advantage when the at least one filter is adapted to be replaced on the clean chamber side. With such a configuration, the filter can be removed by the user on the clean chamber side of a filter holder. The risk of the user coming into contact with the dust adhering to the filter is reduced, as a result.

In one preferred embodiment of the road sweeper according to the invention, the pressure container is arranged in a pivotally mounted cover part of a housing of the road sweeper. The cover part can be pivoted back and forth between a closed position, in which it is seated on a lower part and sealingly closes the suction conduit, and an open position, in which it releases the suction conduit and the at least one filter on the clean chamber side. This facilitates the replacement of the at least one filter and also makes simple access to the pressure container wall possible, on which the at least one external air valve is arranged.

The road sweeper favorably comprises a housing wall which surrounds the pressure container with the exception of the pressure container wall which has the at least one external air valve. This enables the noise to be dampened considerably. The pressure container is subject continuously to variations in pressure during operation of the road sweeper since air subject to pressure can escape at intervals in time via the at least one external air valve. These variations in pressure lead to the generation of noise. As a result of the fact that the housing wall surrounds the pressure container with the exception of the pressure container wall having the external air valves, the generation of noise is dampened.

The housing wall surrounding the pressure container with the exception of the pressure container wall having the at least one external air valve can be designed, for example, as an outer wall of the cover part.

The cover part can be configured as a rotationally molded part, i.e., as a plastic part which is produced by a rotational molding method.

The following description of one preferred embodiment of the invention serves to explain the invention in greater detail in conjunction with the drawings.

BRIEF DESCRIPTION OF THE DRAWINGS

FIG. 3 shows a sectional view corresponding to FIG. 2, wherein the cover part takes up an open position; and FIG. 4 shows a sectional view along line 4-4 in FIG. 2.

DETAILED DESCRIPTION OF THE INVENTION

Figure 1:
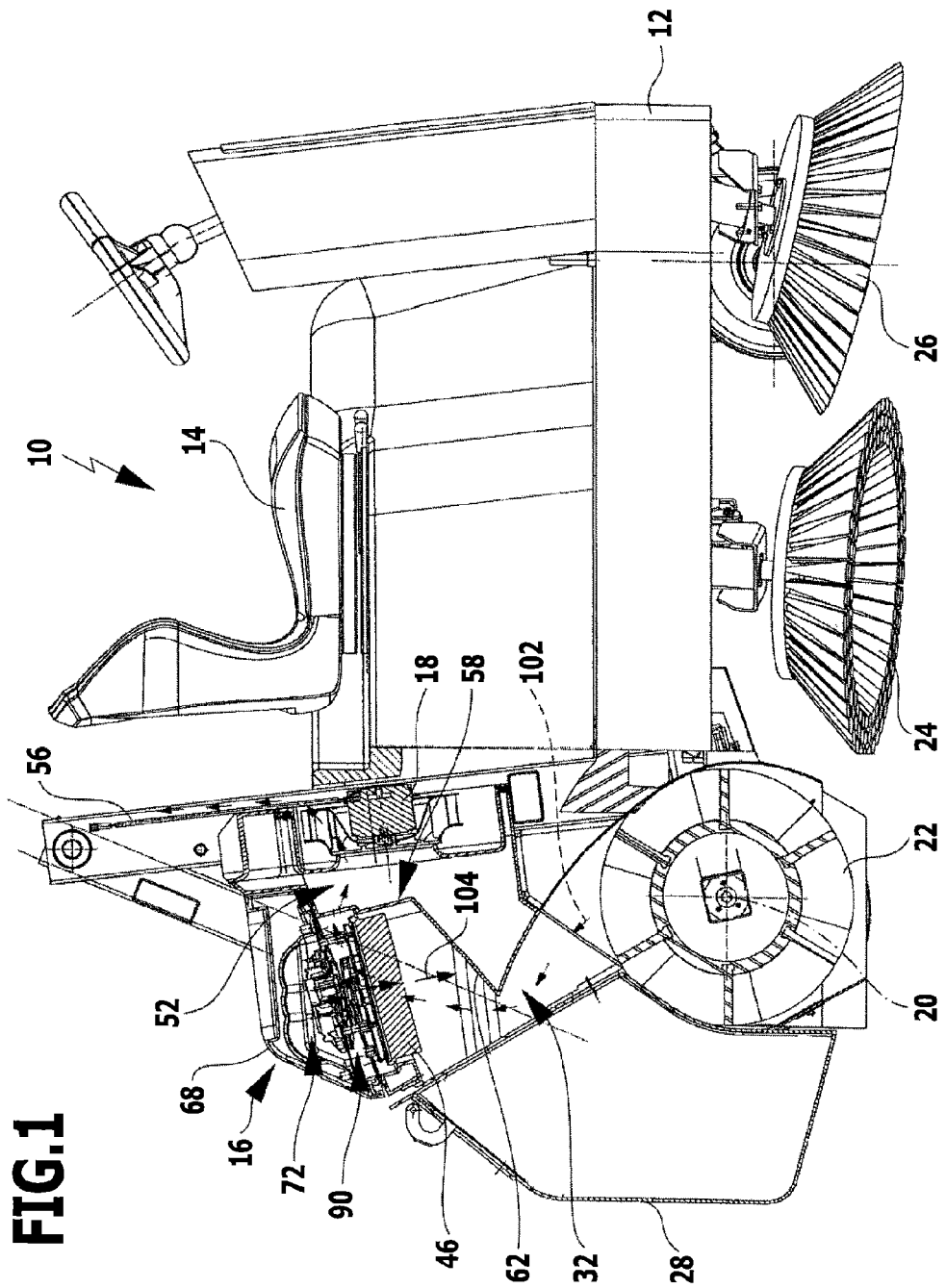
FIG. 1 shows a partially cutaway side view of a road sweeper according to the invention.

The drawings illustrate schematically a road sweeper 10 according to the invention with a chassis 12 and a driver's seat 14 as well as a housing 16, in which a suction blower 18 is arranged and on the underside of which a sweeping brush is mounted, which is in the form of a sweeping roller 22 and can be rotatingly driven about a horizontal axis of rotation 20. The sweeping roller 22 is driven with the aid of a motor which is known per se and not illustrated in the drawings. In this respect, it may, for example, be a combustion engine or also an electric motor. The motor can, at the same time, form a travel drive for the mobile motor-driven road sweeper 10.

In addition to the sweeping roller 22, the road sweeper 10 comprises two plate brushes 24, 26 which are arranged beneath the chassis 12 and can likewise be driven to perform a rotary movement, wherein their axis of rotation extends essentially vertically.

The housing 16 of the road sweeper 10 comprises a sweepings container 28 which is releasably held on a lower part 30 of the housing and receives coarse sweepings which will be taken up from a ground surface to be cleaned with the aid of the sweeping roller 22.

An intake duct 32 extends within the lower part 30 of the housing and this starts at the sweeping roller 22 and extends as far as an intake opening 34 of the lower part 30 of the housing, at which a holding plate 36 is arranged. The holding plate 36 has, altogether, three suction openings 38, 40 and 42, at each of which a filter is held in the form of a flat-fold filter. The flat-fold filters 44, 46, 48 are all of an identical design.

The lower part 30 of the housing accommodates the suction blower 18 in the area between the filters 44, 46, 48 and the driver's seat 14. The blower is in flow communication with the clean sides 54 of the filters 44, 46, 48 facing away from the intake duct 32 via a suction conduit 52. Suction air, which is drawn in by the suction blower 18, can be discharged to the surroundings via an outlet duct 56.

A dividing wall 58 extends between the intake duct 32 and the suction conduit 52 and this forms a duct wall of the intake duct 32 and is configured in the form of a baffle wall 62 at a distance from the dirt side 60 of the filters 44, 46, 48 facing the intake duct 32.

Figure 2:
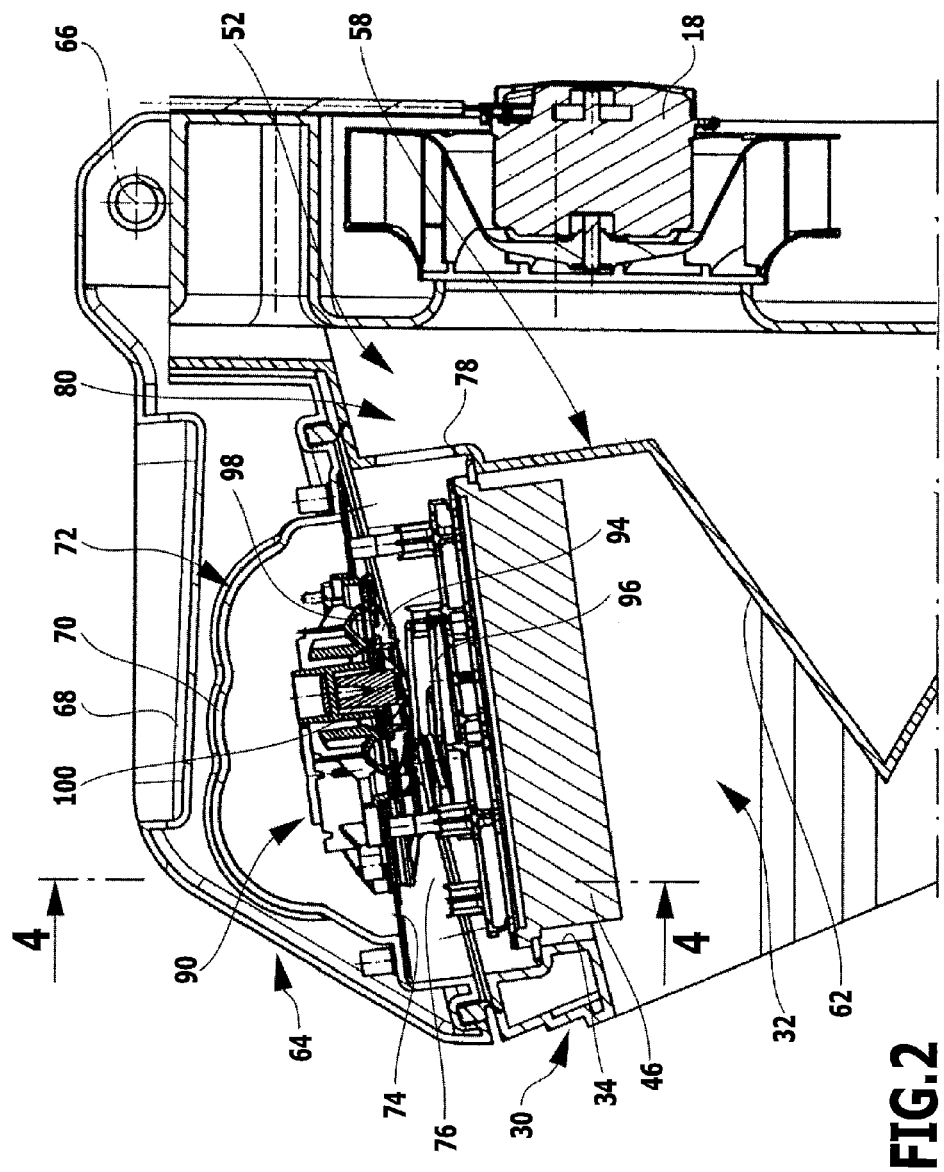
FIG. 2 shows an enlarged sectional view in the area of a cover part of the road sweeper, wherein the cover part takes up a closed position.

On the upper side, a cover part 64 is articulatedly mounted on the lower part 30 of the housing of the road sweeper 10 and is pivotable about a pivot axis 66 between the closed position illustrated in FIG. 2 and the open position illustrated in FIG. 3. The cover part 64 comprises an outer wall 68 which engages over a curved cover wall 70 of a pressure container 72. The cover wall 70 is produced from plastic and screwed to a flat bottom wall 74 with the interposition of a sealing element which is not illustrated in the drawings. The bottom wall 74 is arranged opposite the clean side 54 of the filters 44, 46, 48 and limits the upper side of a first suction conduit section 76 in the closed position of the cover part 64, this suction conduit section extending from the clean side 54 of the filters 44, 46, 48 as far as a passage 78 in the dividing wall 58. The passage 78 is adjoined by a second suction conduit section 80 in the direction of the suction blower 50.

The flat-fold filters 44, 46, 48 each define a filter plane 82, 84, 86 in the first suction conduit section 76 on the clean side. The bottom wall 74 of the pressure container 72 is arranged parallel to the filter planes 82, 84, 86. This is apparent, in particular, from FIG. 4. Therefore, the bottom wall 74 also extends parallel and at a relatively small distance from the holding plate 36. The distance is preferably at the most as great as the diameter of the valve plate 94 which is explained in the following.

An external air valve 88, 90, 92, via which external air subject to pressure can be discharged from the pressure container 72, is arranged on the bottom wall 74 directly opposite the clean sides 54 of each of the filters 44, 46, 48.

The external air valves 88, 90 and 92 are of an identical design. They each have a valve plate 94 which is pressed by a helical closure spring 96 in the direction of a closed position, in which it sealingly closes an external air opening 98 in the bottom wall 74. The closure spring 96 is relaxed in the closed position of the valve plate 94. The closure spring 96 will be tensioned when the valve plate 94 transfers from its closed position into its open position. The valve plate 94 is held in its closed position by an electromagnet 100. The electromagnet 100 is acted upon for this purpose with an exciting current by a control unit of the road sweeper 10 which is known per se and not, therefore, illustrated in the drawings. When the exciting current is interrupted, the valve plate 94 will transfer automatically into an open position, in which it is at a distance from the external air opening 98, on account of the overpressure of the air stored in the pressure container 72 acting on it and so external air can flow out of the pressure container 72. Subsequently, the closure spring 96 guides the valve plate 94 back into its closed position again, in which it is then held due to the action of the electromagnet 100 which is again acted upon with a current.

As a result of a briefly interruption of the exciting current of the electromagnet 100, the external air valves 88, 90 and 92 can be opened for a short time one after the other so that air subject to pressure can escape from the pressure container 72.

When the external air valves 88, 90 and 92 are opened, a respective pressure pulse is formed. Since the external air valves 88, 90 and 92 are each arranged in alignment with a flat-fold filter 44, 46 and 48, respectively, and the external air exiting from the pressure container 72 impinges directly on the clean side 54 of the respective flat-fold filter 44, 46 and 48, the respective flat-fold filter 44, 46 and 48 will be jarred mechanically by the pressure pulse and cleaned off as a result and at the same time some of the external air flows through the flat-fold filter 44, 46 and 48, respectively, contrary to the suction flow prevailing during normal sweeping operation of the road sweeper 10. As a result, the cleaning off of the filters will be intensified. The pressure pulse subsequently impinges on the baffle wall 62 arranged at a distance from the dirt side 60 of the flat-fold filters 44, 46, 48 and will be reflected by it back to the filter.

During normal sweeping operation, the sweeping roller 22 will be rotatingly driven, as explained in the above, and at the same time dust-containing air will be drawn in by the suction blower 50 via the intake duct 32, the flat-fold filters 44, 46, 48 and the suction conduit 52. The suction flow which forms is illustrated in FIG. 1 by the arrows 102. Coarse sweepings will be transferred from the sweeping roller 22 into the sweepings container 28 and the air drawn in will be freed from dust by the filters 44, 46, 48. A large part of the dust will be deposited on the dirt side 60 of the filters 44, 46. As a result, the air permeability of the filters 44, 46, 48 is reduced and the suction effect of the suction blower 50 within the intake duct 32 is increasingly reduced.

A cleaning off of the filters 44, 46, 48 therefore takes place at regular intervals. In this respect, one of the filters 44, 46 and 48, respectively, will be cleaned off each time and at the same time suction operation will be maintained via the other filters. For the purpose of cleaning off the filters, the external air valve 88, 90 and 92, respectively, which is located opposite to and in alignment with the filter to be cleaned off, will be opened for a short time in that the exciting current of the electromagnet 100 is interrupted. Air subject to pressure, which is stored in the pressure container 72, impinges abruptly on the clean side 54 of the filter to be cleaned, as a result. In this respect, a sizeable pressure pulse is formed which mechanically jars the filter to be cleaned off. Some of the compressed air which escapes from the pressure container 72 flows through the filter to be cleaned off contrary to the direction of flow 102 prevailing during normal suction operation and is again drawn off via the adjacent filters. The flow of external air which forms during the cleaning off of the filters is illustrated in FIG. 1 by the arrows 104.

The overpressure prevailing within the pressure container 72 during sweeping operation is less than 1 bar, in particular less than 0.5 bar. For the purpose of providing the air subject to pressure, the road sweeper 10 has a compressor 106 which is in flow communication with the pressure container 72 via a pressure line which is known per se and not, therefore, illustrated in the drawings in order to achieve a better overview. The compressor 106 is started at intervals of time in order to provide an overpressure of 280 mbar to 330 mbar within the pressure container 72. The pressure container 72 has for this purpose a volume of less than 10 liters, for example a volume of 6 to 8 liters, in particular 7 liters.

The filters 44, 46, 48 are cleaned off one after the other, wherein normal suction operation is ensured between the cleaning off of two filters in that all the external air valves 88, 90, 92 are closed.

The external air valves 88, 90 and 92 have not only the function of acting on the respectively associated filter 44, 46 or 48 with a pressure pulse for the purpose of cleaning it off but they also serve, in addition, as safety valves, with which it is ensured that no inadmissibly high overpressure is formed within the pressure container 72. If, for example, the pressure prevailing within the pressure container 72 exceeds a predetermined maximum pressure on account of a malfunctioning of the compressor 106, the external air valves 88, 90, 92 transfer automatically into their open position. For this purpose, the magnetic retaining force exerted on the valve plates 94 by the electromagnets 100 is predetermined in such a manner that when a maximum admissible overpressure in the pressure container 72 is exceeded, the pressure force acting on the valve plates 94 on account of the prevailing overpressure exceeds the magnetic retaining force. Therefore, the external air valves 88, 90, 92 also undertake the function of a safety valve for the pressure container 72. An additional safety valve can be omitted.

The filters 44, 46, 48 are held on the holding plate 36 so as to be replaceable. For the purpose of replacing them, the cover part 64 of the housing 16 of the road sweeper 10 can be pivoted into its open position illustrated in FIG. 3. The filters 44, 46, 48 are than directly accessible on the clean chamber side and can be removed from the holding plate 36.

It is apparent from FIG. 3 that a supporting element in the form of a supporting grate 108 is arranged on the outer side of the bottom wall 74 in alignment with each of the filters 44, 46, 48 and is supported on the clean side 54 of the filters 44, 46, 48 in the closed position of the cover part 64. The filters 44, 46, 48 are supported by the respective supporting grate 108 on the clean side during normal sweeping operation of the road sweeper 10. A closure spring 96 is clamped each time between the supporting grate 108 and the valve plate 94. The spring is therefore accessible to the user in a simple manner in the open position of the cover part 64.

It is clear from the above that the road sweeper 10 has a constructionally simple design, wherein cleaning off of the filters can be achieved in an effective manner by providing a relatively low overpressure of approximately 300 mbar in the pressure container 72. This makes the use of relatively small filters 44, 46, 48 possible as well as a suction blower 50 with a relatively low electric power. Despite the use of the rather small filters 44, 46, 48, a permanent underpressure in the intake duct 32 can be ensured by the suction blower 50 and so the generation of dust during operation of the road sweeper 10 can be kept low. In this respect, it is ensured that no external air exits to the outside via the intake duct 32 during the cleaning off of the filters. The cleaning takes place with a relatively small amount of external air but a considerable pressure pulse is generated which ensures the cleaning off of the filters 44, 46, 48.

What is claimed is:

1. A road sweeper with a rotatingly drivable sweeping brush and a sweepings container as well as a suction blower in flow communication with the sweeping brush via a suction conduit and an intake duct for the purpose of taking in dust-containing air, and with at least one filter for separating dust from the air drawn in, wherein the at least one filter can be acted upon on the clean side with external air subject to pressure and stored in a pressure container via at least one external air valve for the purpose of cleaning, wherein the pressure container has a pressure container wall located opposite the clean side of the at least one filter, the at least one external air valve being arranged on said wall, and wherein a section of the suction conduit extends between the pressure container wall and the clean side of the at least one filter.

2. The road sweeper as defined in claim 1, wherein the pressure container wall having the at least one external air valve forms a duct wall of the suction conduit.

3. The road sweeper as defined in claim 1, wherein the at least one filter is a flat-fold filter defining a filter plane on the clean side and the pressure container wall is aligned parallel to the filter plane.

4. The road sweeper as defined in claim 1, wherein the pressure container wall forms a bottom wall of the pressure container.

5. The road sweeper as defined in claim 4, wherein the pressure container has a curved cover wall sealingly connected to the bottom wall.

6. The road sweeper as defined in claim 4, wherein the bottom wall is produced from metal or from a plastic material.

7. The road sweeper as defined in claim 5, wherein the cover wall is produced from a plastic material.

8. The road sweeper as defined in claim 1, wherein a baffle wall is arranged at a distance from the dirt side of the at least one filter.

9. The road sweeper as defined in claim 8, wherein the baffle wall is a duct wall of the intake duct.

10. The road sweeper as defined in claim 1, wherein the at least one external air valve is a safety valve opening when a maximum admissible overpressure in the pressure container is exceeded.

11. The road sweeper as defined in claim 1, wherein the at least one external air valve is a magnetic valve with a valve plate held in a closed position by an electromagnet acted upon by a current.

12. The road sweeper as defined in claim 1, wherein the overpressure in the pressure container is at the most 1 bar.

13. The road sweeper as defined in claim 12, wherein the overpressure in the pressure container is at the most 500 mbar.

14. The road sweeper as defined in claim 1, wherein the road sweeper has several external air valves each arranged in alignment with a filter or a filter section.

15. The road sweeper as defined in claim 1, wherein the at least one filter is adapted to be replaced on the clean chamber side.

16. The road sweeper as defined in claim 1, wherein the pressure container is arranged in a pivotally mounted cover part of a housing of the road sweeper.

17. The road sweeper as defined in claim 1, wherein the pressure container is surrounded by a housing wall of the road sweeper with the exception of the pressure container wall having the at least one external air valve.

* * * * *

UNITED STATES PATENT AND TRADEMARK OFFICE
CERTIFICATE OF CORRECTION

PATENT NO. : 8,505,161 B2  
APPLICATION NO. : 13/567657  
DATED : August 13, 2013  
INVENTOR(S) : Schick et al.

Page 1 of 1

It is certified that error appears in the above-identified patent and that said Letters Patent is hereby corrected as shown below:

Title page, item (75), the name of the city of residence for the third inventor is spelled incorrectly, it should appear as:

Peter Knebel, Schorndorf (DE)

Title page, item (30), under the heading "Foreign Application Priority Data," the last digit of the foreign priority application number was omitted, it should appear as follows:

Foreign Application Priority Data

Feb. 8, 2010 (DE) . . . . . . . . . . . 10 2010 001 678.<u>0</u>

Signed and Sealed this  
Seventeenth Day of December, 2013

Margaret A. Focarino  
*Commissioner for Patents of the United States Patent and Trademark Office*